(12) United States Patent
Lemmon et al.

(10) Patent No.: US 11,023,199 B2
(45) Date of Patent: Jun. 1, 2021

(54) PLAYBACK ZONE REPRESENTATIONS

(71) Applicant: Sonos, Inc., Santa Barbara, CA (US)

(72) Inventors: Mike Lemmon, Seattle, WA (US); Stephanie Hughes, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/385,941

(22) Filed: Apr. 16, 2019

(65) Prior Publication Data

US 2019/0286313 A1    Sep. 19, 2019

Related U.S. Application Data

(63) Continuation of application No. 14/205,343, filed on Mar. 11, 2014, now abandoned.

(51) Int. Cl.
| | |
|---|---|
| *G06F 3/16* | (2006.01) |
| *G06F 3/0481* | (2013.01) |
| *G06F 3/0482* | (2013.01) |
| *G06F 3/0484* | (2013.01) |
| *H04N 21/436* | (2011.01) |

(52) U.S. Cl.
CPC ............ *G06F 3/165* (2013.01); *G06F 3/0482* (2013.01); *G06F 3/04817* (2013.01); *G06F 3/04847* (2013.01); *H04N 21/43615* (2013.01)

(58) Field of Classification Search
CPC .. G06F 3/04847; G06F 3/165; G06F 3/04817; G06F 3/0482; H04N 21/43615
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

Christine Chan, "Control Your iDevice's Music With Tunes Remote", Nov. 15, 2011, Appadvice.com, all pages (Year: 2011).*

(Continued)

*Primary Examiner* — Roberto Borja
(74) *Attorney, Agent, or Firm* — Akerman LLP

(57) ABSTRACT

Method and systems are provided for displaying a control representation playback zone representation provided on a playback zones view interface. The playback zones view interface allows a user to view and navigate between playback zones in a media playback system, and the control representation in the playback zone representation is selectable to allow the user to control playback of media content in the corresponding playback zone from the playback zones view interface without having to navigate to a particular playback control interface corresponding to the playback zone.

22 Claims, 6 Drawing Sheets

(56) References Cited

U.S. PATENT DOCUMENTS

| | | | |
|---|---|---|---|
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne et al. |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2004/0119745 | A1 | 6/2004 | Bartek et al. |
| 2005/0149872 | A1 | 7/2005 | Fong et al. |
| 2007/0142944 | A1 | 6/2007 | Goldberg et al. |
| 2010/0114857 | A1 | 5/2010 | Edwards et al. |
| 2010/0299639 | A1* | 11/2010 | Ramsay .............. G06F 3/0486 715/835 |
| 2010/0332565 | A1* | 12/2010 | Al-Shaykh ............ H04N 7/163 707/912 |
| 2013/0254308 | A1 | 9/2013 | Rose et al. |
| 2014/0109138 | A1* | 4/2014 | Cannistraro .......... H04L 67/125 725/37 |
| 2014/0122589 | A1* | 5/2014 | Fyke ................... H04L 65/1069 709/204 |
| 2014/0267103 | A1* | 9/2014 | Chaudhri ................ G09G 5/14 345/173 |
| 2014/0281983 | A1* | 9/2014 | Xian ...................... G06F 3/167 715/716 |
| 2015/0088966 | A1* | 3/2015 | Gayles ................... H04L 67/22 709/203 |
| 2015/0100623 | A1 | 4/2015 | Gudell et al. |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Oct. 16, 2018, issued in connection with U.S. Appl. No. 14/205,343, filed Mar. 11, 2014, 52 pages.
Final Office Action dated Aug. 18, 2017, issued in connection with U.S. Appl. No. 14/205,343, filed May 11, 2014, 49 pages.
Final Office Action dated Jun. 30, 2016, issued in connection with U.S. Appl. No. 14/205,343, filed Mar. 11, 2014, 26 pages.
First Action Interview Office Action Summary dated Feb. 4, 2016, issued in connection with U.S. Appl. No. 14/205,343, filed Mar. 11, 2014, 9 pages.
First Action Interview Pilot Program Pre-Interview Communication dated Nov. 19, 2015, issued in connection with U.S. Appl. No. 14/205,343, filed Mar. 11, 2014, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 10, 2018, issued in connection with U.S. Appl. No. 14/205,343, filed Mar. 11, 2014, 54 pages.
Non-Final Office Action dated Jan. 31, 2017, issued in connection with U.S. Appl. No. 14/205,343, filed Mar. 11, 2014, 45 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 13/904,896, filed May 29, 2013, "Playback queue control via a playlist on a mobile device" Kumar et al.
U.S. Appl. No. 13/904,909, filed May 29, 2013, "Playback Queue Control Transition" Kumar et al.
U.S. Appl. No. 13/904,923, filed May 29, 2013, "Connected State Indicator" Kumar et al.
U.S. Appl. No. 13/904,932, filed May 29, 2013, "Moving a Playback Queue to a New Zone" Kumar et al.
U.S. Appl. No. 13/904,936, filed May 29, 2013, "Private Queue Indicator" Kumar et al.
U.S. Appl. No. 13/904,944, filed May 29, 2013, "Playlist Modification" Kumar et al.
U.S. Appl. No. 13/904,949, filed May 29, 2013, "Playback Zone Silent Connect" Kumar et al.
U.S. Appl. No. 14/194,257, filed Feb. 28, 2014, "Playback Zone Representations" Kumar et al.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

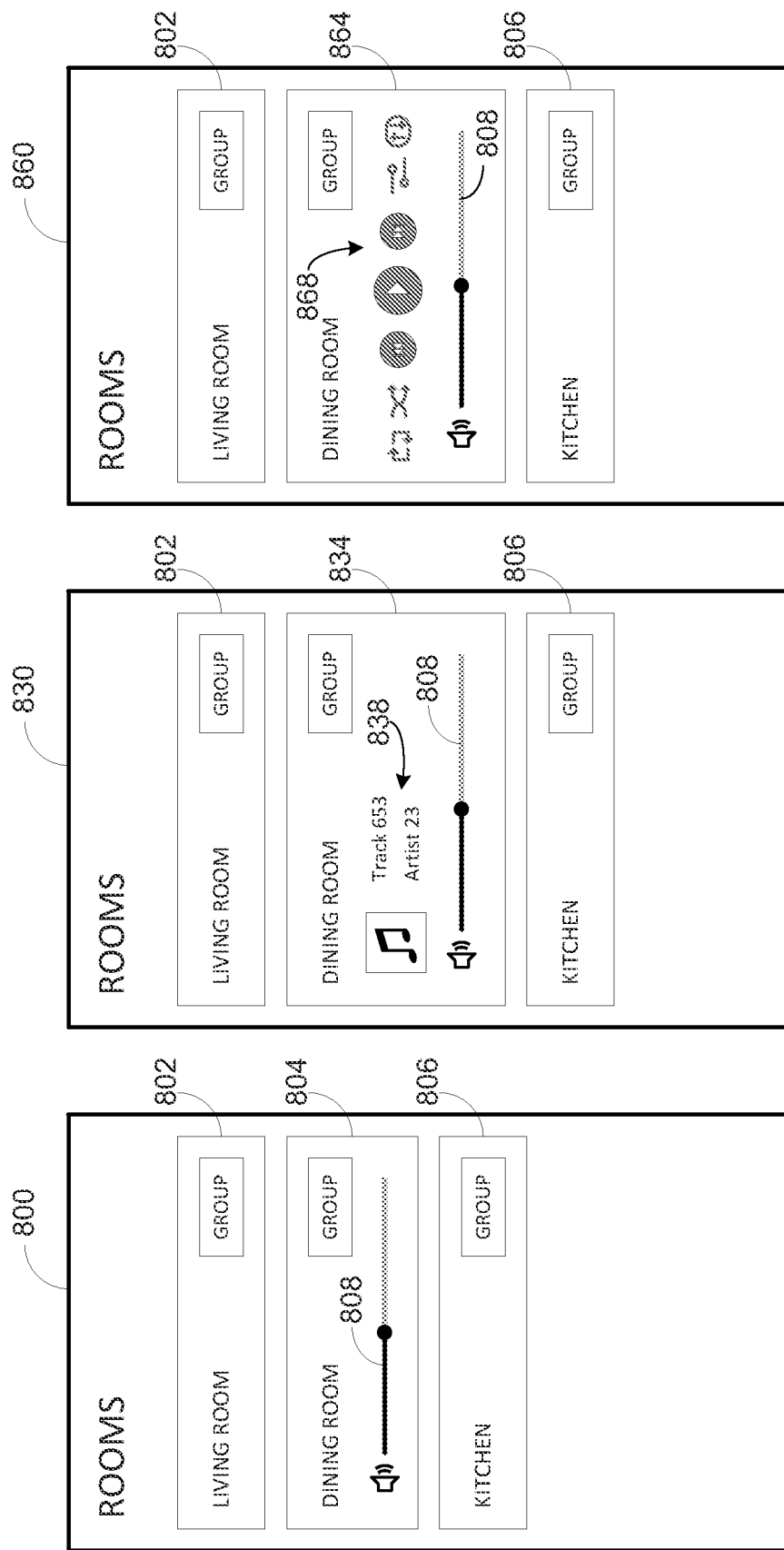

PLAYBACK ZONE REPRESENTATIONS

CROSS REFERENCE TO RELATED APPLICATIONS

This application is a continuation of U.S. non-provisional patent application Ser. No. 14/205,343, filed Mar. 11, 2014, entitled "Playback Zone Representations," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 8A shows a third example of playback zone representations;

FIG. 8B shows a fourth example of playback zone representations; and

FIG. 8C shows a fifth example of playback zone representations.

Figure 1:
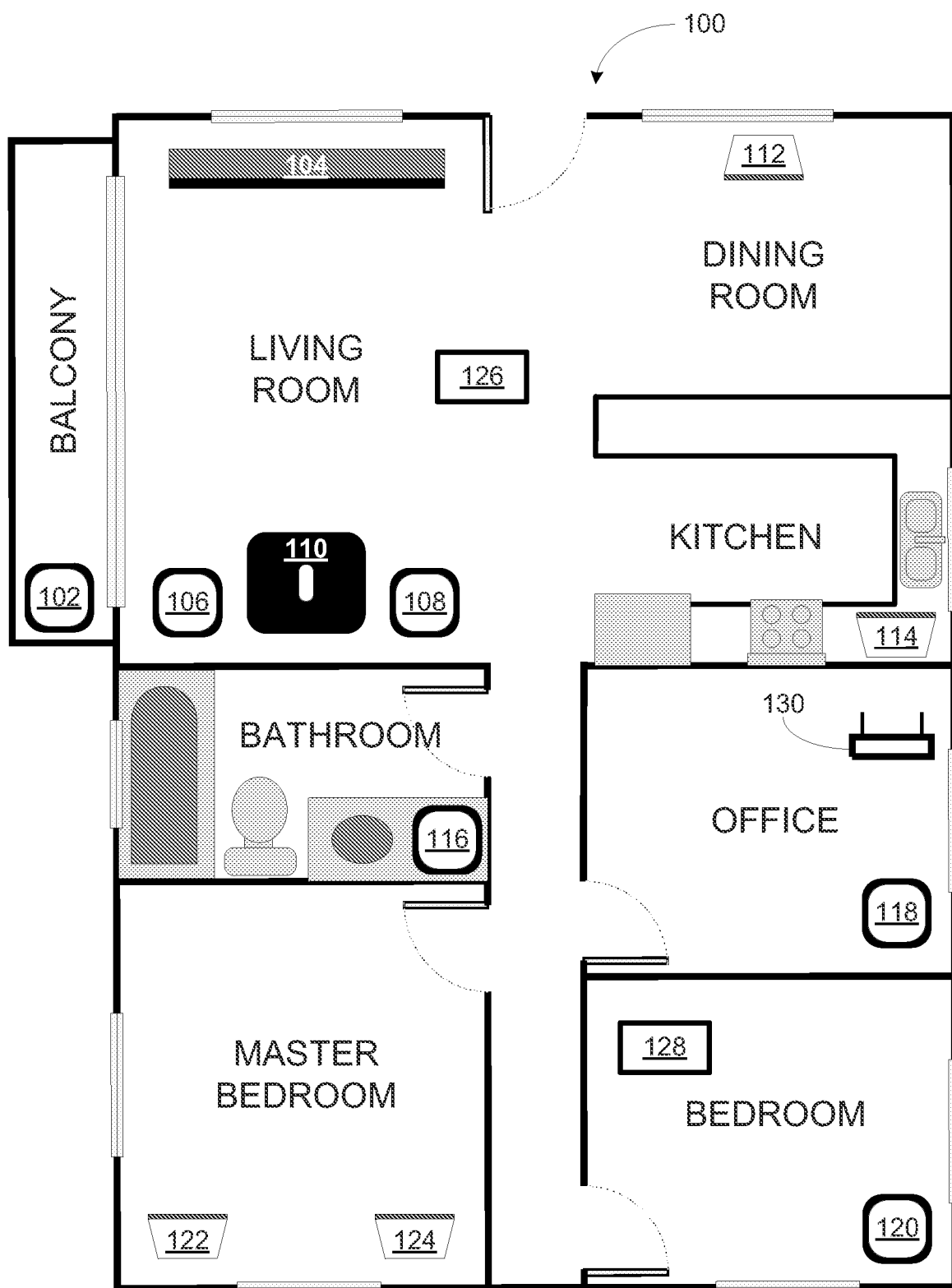
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve displaying in a playback zones view of a controller interface, a control representation that is selectable by a user to modify playback of media content by the playback zone. The control representation may include one or more of a volume representation or playback control representations such as a play icon, a pause icon, a skip forward icon, or skip backward icon, among others. The playback zones view of the controller interface displays playback zones and/or zone groups of a media playback system and may be accessed by the user to view and navigate between the different playback zones and/or zone groups. As such, the embodiments of the present application allow the user to control at least some aspects of media playback by a playback zone or zone group directly from the playback zone view, without having to navigate to a particular controller interface for the playback zone or zone group.

In one example, the control representation is provided in every playback zone representation shown in the playback zone view. In another example, the control representation may be displayed only when the playback zone representation is selected by the user, or if the playback zone is associated with media content. In some cases, the dimensional size of the zone representation may change depending on whether the control representation is provided.

In one example, the embodiments of the present application may be applied to a controller software application for the media playback system. In another example, the embodiments may be applied to a service provider application when a user wishes to use the media playback system to play media content from the service provider while accessing the service provider application.

As indicated above, the present application involves displaying selectable control representations in playback zone representations of a controller interface for a media playback system. In an embodiment, a method is provided. The method involves displaying in a playback zones view interface, a playback zone representation corresponding to a playback zone of a media playback system, and displaying in the playback zone representation, a control representation selectable to modify playback of media content by the playback zone.

In another embodiment, a device is provided. The device includes a processor and memory having stored thereon instructions executable by the processor to cause the device to perform functions. The functions include displaying in a playback zones view interface, a playback zone representation corresponding to a playback zone of a media playback system, and displaying in the playback zone representation, a control representation selectable to modify playback of media content by the playback zone.

In yet another embodiment, a non-transitory computer readable memory is provided. The non-transitory computer readable memory has stored thereon instructions executable by a computing device to cause the computing device to perform functions. The functions include displaying in a playback zones view interface, a playback zone representation corresponding to a playback zone of a media playback system, and displaying in the playback zone representation, a control representation selectable to modify playback of media content by the playback zone.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
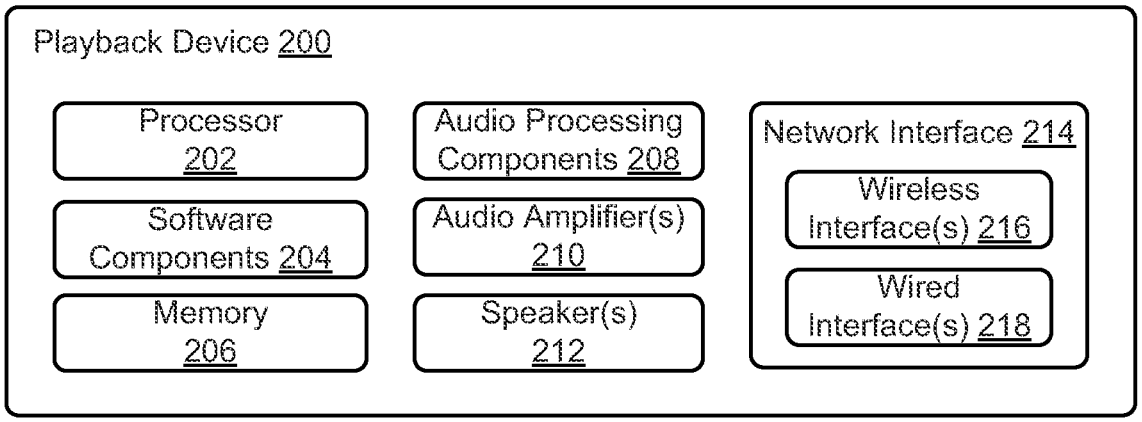
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content truly be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render fill frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONGS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For stance, the user may be grilling in the balcony zone and listening to hip hop music being played by the playback device 102 while another user may be preparing food in the kitchen zone aid listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
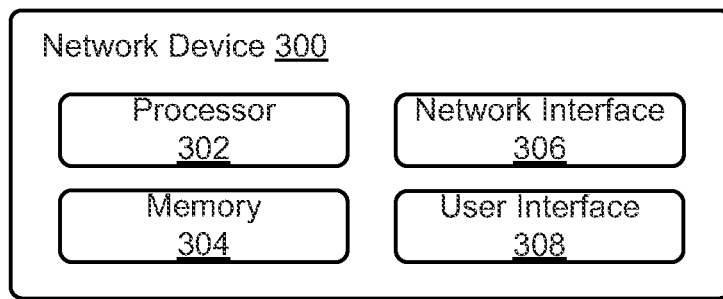
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
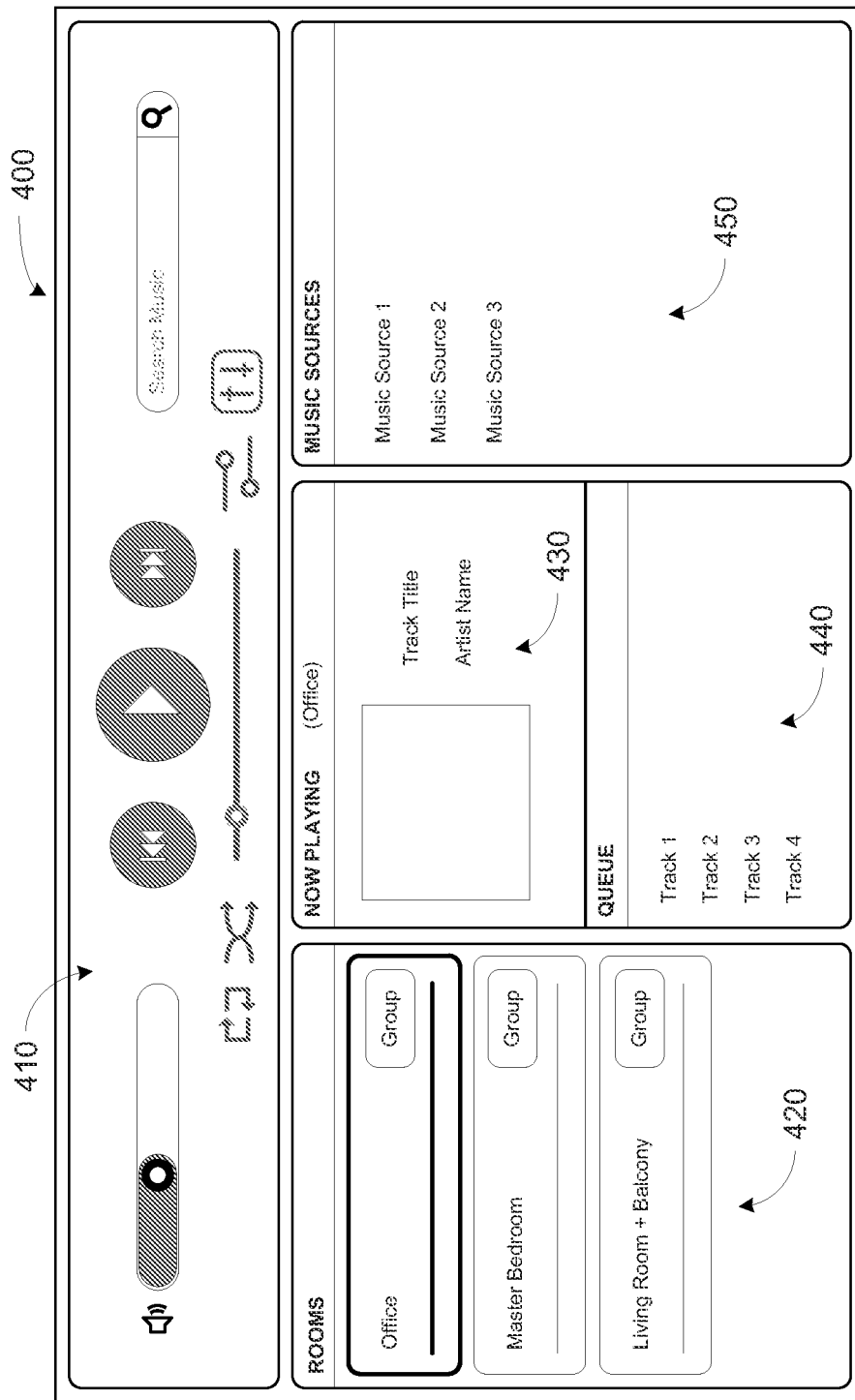
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon shay be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Displaying Playback Zones Representations

Figure 5:
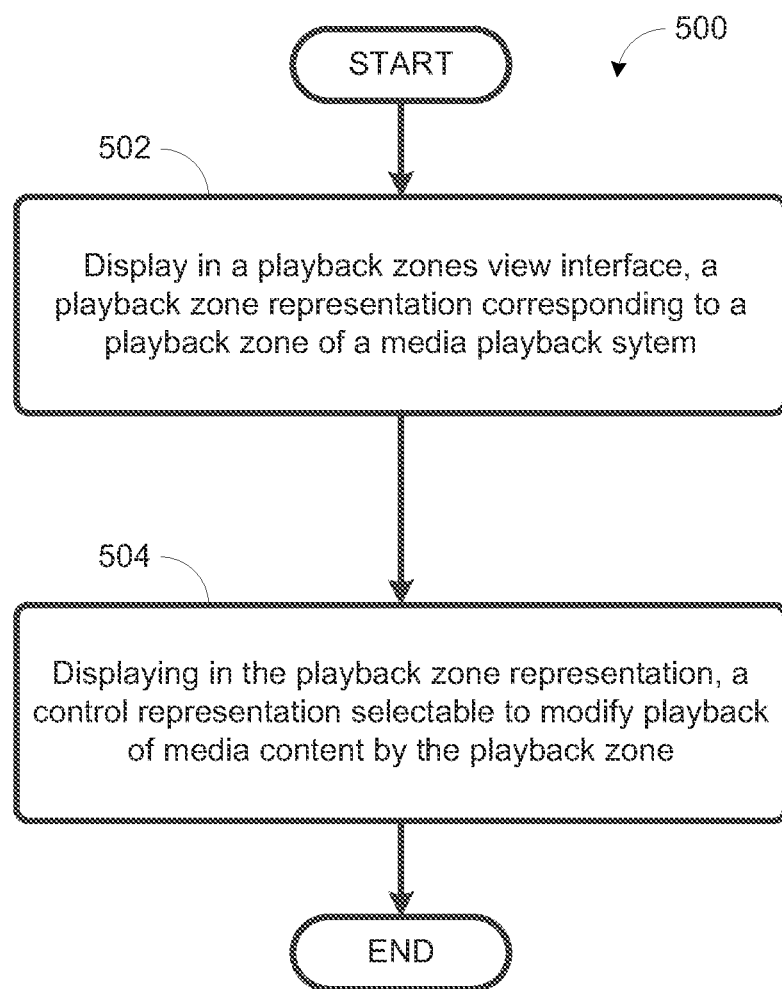
FIG. 5 shows an example flow diagram for displaying playback zone representations.

As mentioned above, embodiments described herein involve displaying in a playback zones view of a controller interface, a control representation that is selectable by a user to modify playback of media content by the playback zone. Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-504. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, the method 500 involves displaying in a playback zones view interface, a playback zone representations corresponding to a playback zone of a media playback system. The playback zone view interface may provide a playback zone representation for each playback zone or zone group in a media playback system, and may be accessed by a user to view and/or navigate between the different playback zones.

In one example, referring back to the controller interface 400 of FIG. 4, the playback zones view interface may be an example version of the playback zone region 420. In another case, the playback zones view interface may represent one of multiple tabs or views of a controller interface. For instance, if the controller interface is provided on a device having a smaller display, such as a mobile phone, the device may display only one of the different regions of the controller interface 400 at a time. In such a case, the user may access the other regions by interacting with the controller interface. In other words, the playback zones view interface may be provided on the controller interface when the user interacts with the controller interface to view and access the different playback zones in the media playback system.

In another example, the playback zones view interface may be provided as part of, or as an extension of a third party software application. The third party software application may be a service provider application that the user can use to access media content from a corresponding service provider. As such, the playback zones view interface may be provided when the user wishes to use the media playback system to play media content from the service provider while accessing the service provider application.

Figures 6, 7:
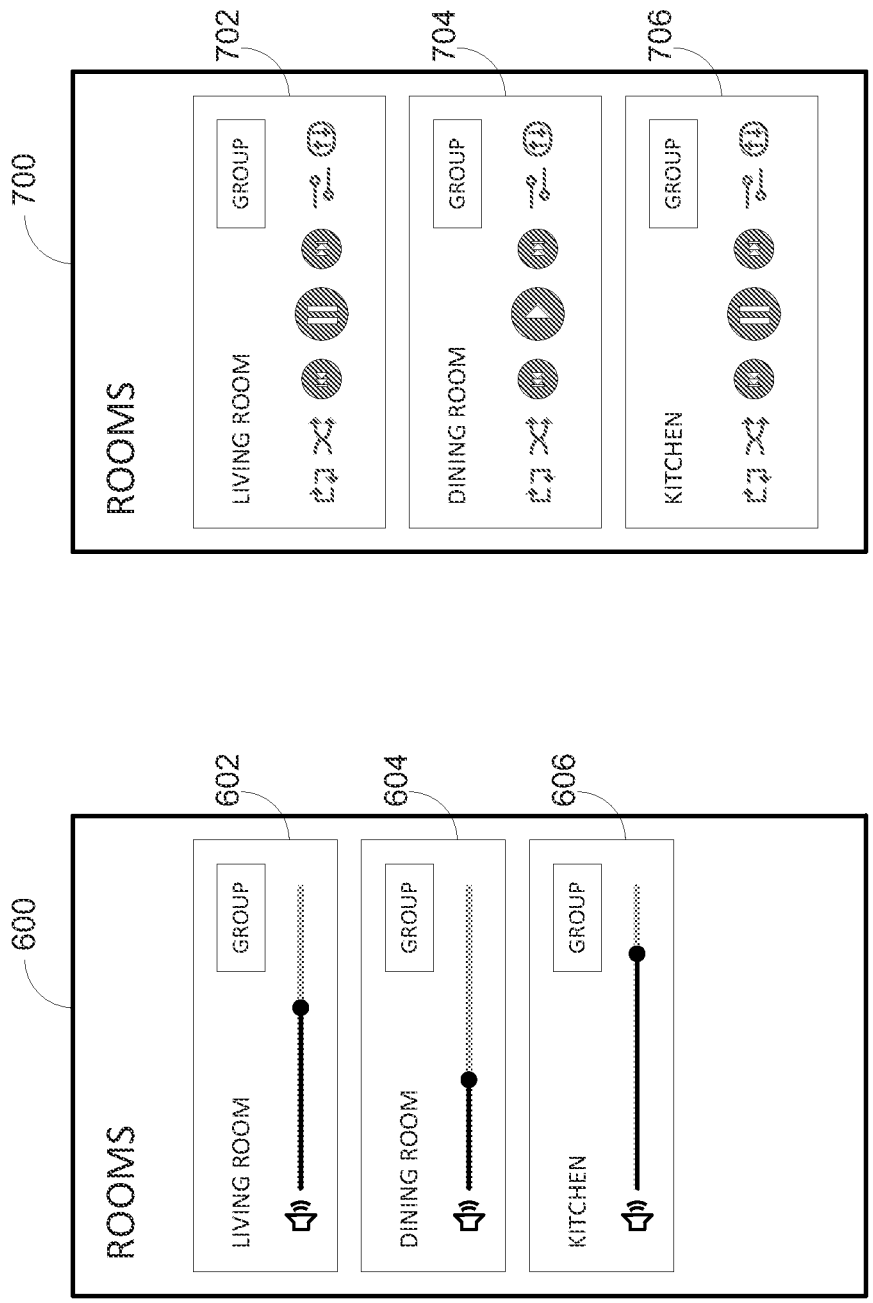
FIG. 6 shows a first example of playback zone representations.
FIG. 7 shows a second example of playback zone representations.

At block 504, the method 500 involves displaying in the playback zone representation, a control representation selectable to modify playback of media content by the playback zone. In one example, the control representation may be a volume representation that is selectable to modify a playback volume of the playback zone. FIG. 6 shows a first example interface 600 displaying a playback zone representation 602 for a "Living Room" zone, a playback zone representation 604 for a "Dining Room" zone, and a playback zone representation 606 for a "Kitchen" zone.

As shown, each of the playback zone representations 602, 604, and 606 include a name of the corresponding playback zone, and a "group" icon selectable to modify playback zone configurations for the media playback system. As also shown, each of the playback zone representations 602, 604, and 606 includes a volume representation indicating a playback volume of the corresponding playback zone. The volume representation may also be selectable to modify the playback volume of the playback zone.

As shown in FIG. 6, the volume representations may be in the form of horizontal bars with sliders that are selectable to adjust the playback volume of the corresponding playback zone. In another example that is not shown, the volume representation may be a numeric representation (e.g. 56 or $^{56}/_{100}$). In some cases, both the horizontal bar representation and a corresponding numeric representation may be displayed and selectable.

When a user selects a volume representation for a corresponding playback zone and modifies the volume, a message may be sent to at least one playback device in the playback zone indicating the selection and modification. The at least one playback device in the playback zone may then adjust the playback volume in the playback zone according to the message.

In another example, the control representation may be icons associated with playback statuses and/or playback modes. For instance, the icons may be selectable to modify certain playback statuses of the playback zone, including causing the playback zone to play the media content, pause playback of the media content, fast forward the media content, rewind the media content, skip to a next media item in the media content, and skip to a previous media item in the media content, among others. Further, the icons may be selectable to modify certain playback modes of the playback zone, including causing the playback of media content in the playback zone to enter a shuffle playback mode, exit a shuffle playback mode, enter a repeat playback mode, exit a repeat playback mode, enter a media cross fade mode, and exit a media crossfade mode, among others.

FIG. 7 shows a second example interface 700 displaying a playback zone representation 702 for a "Living Room" zone, a playback zone representation 704 for a "Dining Room" zone, and a playback zone representation 706 for a "Kitchen" zone. As shown, each of the playback zone representations 702, 704, and 706 include control icons that are selectable to modify playback statuses and/or playback modes of the corresponding playback zone. In some cases, the control icons may also indicate a current playback status and/or playback mode of the corresponding playback zone. For example a display of a selectable "play" icon in zone representation 704 may indicate that no media content is being played in the Dining Room zone. Analogously, a display of a selectable "pause" icon in zone representations 702 and 706 may indicate that media content is being played in the Living Room zone and Kitchen zone. In such a case, one of the selectable play and pause control representations may replace the other in the zone representation as playback of media content is initiated or paused. In another example, if a playback zone is in shuffle playback mode, a shuffle playback icon may be highlighted in the corresponding zone representations. Other examples of control representations and control representation interactions are also possible.

Similar to that discussed above in connection to FIG. 6, when a user selects a control icon for a playback zone, a message may be sent to at least one playback device in the corresponding playback zone indicating the selection and modification. The at least one playback device in the corresponding playback zone may then modify the playback status and/or playback mode of the playback zone according to the message.

Referring back to block 504, the method 500 may in some cases involve receiving an input indicating that the control representation is to be displayed in the playback zone representation prior to displaying the control representation. In one example, the playback zone representations in the playback zones view interface may be provided in a compact format by default. The compact format zone representation may display only a zone name and in some cases the group icon. In one case, zone representations in the playback zones view interface may be provided in the compact format to conserve display real-estate, particularly on controller devices having smaller displays.

In one example, the input to cause the control representation to be displayed may be a selection of the zone representation by a user. For instance, upon viewing a zone representation provided in the compact format on the playback zones view interface, the user may select the zone representation to prompt the control representation to be displayed. The user may then select the displayed control representation to modify playback of media content in the corresponding playback zone. The selections of the zone representation and control representation may involve one or more taps, or mouse-clicks, among other possible user-interface interactions.

In another example, the input may be an indication that the corresponding playback zone is associated with media content. In one example, an association between the playback zone and media content may include media content being played and/or paused by one or more playback devices in the playback zone. In another example, the association between the playback zone and media content may include a playback queue associated with the playback zone being populated with media content. In yet another example, the association between the playback zone and media content may include media content being cached for playback by the playback zone. For instance, if playback of streaming media content or Internet radio by the playback zone is paused with no additional media content in the playback queue associated with the playback zone, the playback zone is still associated with the media content that has been paused. Other examples are also possible.

In such cases, an input may be received when an association between the playback zone and media content established, indicating the association between the playback zone and the media content. In response to the input, the control representation may be displayed in the zone representation.

FIG. 8A shows a third example playback zones view interface 800 including playback zone representations 802, 804, and 806. As shown, zone representations 802 and 806 corresponding to a "Living Room" zone and a "Kitchen" zone, respectively include only zone names and the group icon, but do not include any control representations. In other words, zone representations 802 and 806 may be provided in the compact format mentioned above. On the other hand, zone representation 804 corresponding to a "Dining Room" zone includes a volume representation 808 in addition to the zone name and group icon. The volume representation 808 may be similar to the volume representations discussed previously in connection to FIG. 6. As shown, a dimensional size of the zone representation 804 may have been modified from the compact format to accommodate the volume representation 808 when displaying the volume representation 808.

In one example, the zone representation 804 may previously be provided in the compact format, until the user selected the zone representation 804, resulting in the playback zones view interface 800 shown in FIG. 8A. Once the user is done adjusting the playback volume for the Dining Room zone, the volume representation 808 may disappear and the zone representation 804 may return to be displayed according to the compact format.

In another example, the Living Room and Kitchen zones may not be associated with any media content, while the Dining Room zone is associated with media content. Accordingly, the volume representation 808 may be provided in the zone representation 804. In this case, the volume representation 808 may be displayed until the Dining Room zone is no longer associated with media content.

FIGS. 8B and 8C show alternate example playback zones view interfaces 830 and 860, respectively that may correspond to the scenarios discussed above in connection to FIG. 8A. As shown in FIG. 8B, the Dining Room zone may correspond to a zone representation 834 displaying a control representation, such as the volume representation 808. In this case, the zone representation 834 may also display information 838 associated with the media content that is being played and/or associated with the Dining Room zone. As shown, the information 838 may indicate that the media content associated with the Dining Room zone has example track title "Track 653," and is by example artist "Artist 23." An album art associated with the media content may also be included in the information 838.

As shown in FIG. 8C, the playback zones view interface 860 includes a zone representation 864 corresponding to the Dining room zone. In this case, the zone representation 864 may display media playback control icons selectable to modify playback statuses and/or playback modes of the Dining Room zone, in addition to the volume representation 808. The control icons 868 may be similar to the control icons discussed previously in connection to FIG. 7.

One having ordinary skill in the art will appreciate that other example zone representations displaying different control representations and/or combinations of control representations within the scope of the present application are also possible. One having ordinary skill in the art will further appreciate that in the example interfaces discussed above, the top-to-bottom order in which the zone representations are displayed on an interface may be based on one or more variables. In one example, the zone representations may be ordered according to a chronological order in which the playback zones were established. In another example, the zone representations may be ordered alphabetically based on names of the playback zones. In a further example, the zone representations may be ordered based on which playback zone most frequently plays media content, or most recently played media content. In yet another example, the zone representations may be ordered based on whether the playback zone is associated with any media content. For instance, zone representations displayed according to the expanded format due to art association with media content may be provided first on the controller interface. Other examples, including various combinations of the above mentioned examples, are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves displaying selectable control representations in playback zone representations of a controller interface for a media playback system. In an embodiment, a method is provided. The method involves displaying in a playback zones view interface, a playback zone representation corresponding to a playback zone of a media playback system, and displaying in the playback zone representation, a control representation selectable to modify playback of media content by the playback zone.

In another embodiment, a device is provided. The device includes a processor and memory having stored thereon instructions executable by the processor to cause the device to perform functions. The functions include displaying in a playback zones view interface, a playback zone representation corresponding to a playback zone of a media playback system, and displaying in the playback zone representation, a control representation selectable to modify playback of media content by the playback zone.

In yet another embodiment, a non-transitory computer readable memory is provided. The non-transitory computer readable memory has stored thereon instructions executable by a computing device to cause the computing device to perform functions. The functions include displaying in a playback zones view interface, a playback zone representation corresponding to a playback zone of a media playback system, and displaying in the playback zone representation, a control representation selectable to modify playback of media content by the playback zone.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. Tangible, non-transitory, computer-readable media having instructions encoded therein, wherein the instructions, when executed by one or more processors, cause a control device to perform a method comprising:

causing a graphical interface of the control device to display a control interface that comprises multiple control representations in respective regions of the control interface, wherein each control representation includes a visible border that delineates the control representation from other control representations, and one or more graphical features arranged within the visible border, wherein each control representation of the multiple control representations corresponds to a respective group of one or more playback devices that are distinct from the control device, and wherein a particular control representation of the multiple control representations corresponds to a particular group of one or more playback devices that are distinct from the control device, receiving an indication that the particular group of one or more playback devices is associated with media content comprising receiving an indication that the media content is cached for playback by the particular group of one or more playback devices, in response to receiving the indication that the particular group of one or more playback devices is associated with media content, modifying the visible border of the particular control representation to a modified state that facilitates inclusion of one or more transport controls within the visible border of the particular control representation and repositioning control representations associated with different groups of one or more playback devices to different regions of the graphical interface so they are displayed without overlapping the particular control representation;

depicting within the visible border, the one or more transport controls, wherein each of the one or more transport controls corresponds to a respective playback action of the following playback actions: (i) initiating playback of the associated media content, (ii) pausing playback of the associated media content, (iii) skipping playback of a portion of the associated media content and playing a portion of the associated media content that follows the skipped portion of the associated media content, or (iv) playing a portion of the associated media content that precedes a portion of the associated media content that is currently queued for playback;

determining that the particular group of one or more playback devices is no longer associated with any media content; and in response to determining that the particular group of one or more playback devices is no longer associated with any media content:

removing the one or more transport controls from the modified particular control representation, thereby causing the graphical interface to display the particular control representation without the one or more transport controls, and returning the visible border of the particular control representation to an unmodified state.

2. The tangible, non-transitory, computer-readable media of claim 1, wherein receiving the indication that the particular group is associated with media content further comprises: (i) receiving an indication that the media content is being played by one or more playback devices in the particular group, (ii) receiving an indication that the media content is paused by one or more playback devices in the particular group, or (iii) receiving an indication that a playback queue associated with the particular group is populated with the media content.

3. The tangible, non-transitory, computer-readable media of claim 1, wherein causing the graphical interface of the control device to display the control interface that comprises multiple control representations in respective regions of the control interface comprises causing the graphical interface of the control device to display the particular control representation in a first region occupying a first area within the displayed control interface, and wherein modifying the particular control representation to facilitate inclusion of the one or more transport controls comprises expanding the visible border and the first region to occupy a second area within the displayed control interface that is larger than the first area.

4. The tangible, non-transitory, computer-readable media of claim 1, wherein the method further comprises:

in response to receiving the indication that the particular group of one or more playback devices is associated with media content, modifying the particular control representation to include a volume slider control that controls volume of the particular group.

5. The tangible, non-transitory, computer-readable media of claim 1, wherein the method further comprises:

in response to receiving the indication that the particular group of one or more playback devices is associated with media content, modifying the particular control representation to include a volume slider control that controls volume of a particular playback device of the particular group.

6. The tangible, non-transitory, computer-readable media of claim 1, wherein the method further comprises:

in response to receiving the indication that the particular group of one or more playback devices is associated with media content, modifying the particular control representation to include a shuffle control that causes the particular group to play back media items of the associated media content in random order.

7. The tangible, non-transitory, computer-readable media of claim 1, wherein the method further comprises:

in response to receiving the indication that the particular group of one or more playback devices is associated with media content, modifying the particular control representation to include a repeat control that causes the particular group to repeatedly play back the associated media content.

8. The tangible, non-transitory, computer-readable media of claim 1, wherein the control interface that comprises multiple control representations in respective regions of the control interface is a first control interface, and wherein the method further comprises:

before causing the graphical interface of the control device to display the first control interface, receiving, within a second control interface, an input representing a command to display the first control interface, wherein the graphical interface of the control device is caused to display the first control interface in response to receiving the input representing the command to display the first control interface.

9. A method comprising:

causing a graphical interface of a control device to display a control interface that comprises multiple control representations in respective regions of the control interface, wherein each control representation includes a visible border that delineates the control representation from other control representations, and one or more graphical features arranged within the visible border, wherein each control representation of the multiple control representations corresponds to a respective group of one or more playback devices that are distinct from the control device, and wherein a particular control representation of the multiple control representations corresponds to a particular group of one or more playback devices that are distinct from the control device, receiving an indication that the particular group of one or more playback devices is associated with media content comprising receiving an indication that the media content is cached for playback by the particular group of one or more playback devices, in response to receiving the indication that the particular group of one or more playback devices is associated with media content, modifying the visible border of the particular control representation to a modified state that facilitates inclusion of one or more transport controls within the visible border of the particular control representation and repositioning control representations associated with different groups of one or more playback devices to different regions of the graphical interface so they are displayed without overlapping the particular control representation;

depicting within the visible border the one or more transport controls, wherein each of the one or more transport controls corresponds to a respective playback action of the following playback actions: (i) initiating playback of the associated media content, (ii) pausing playback of the associated media content, (iii) skipping playback of a portion of the associated media content and playing a portion of the associated media content that follows the skipped portion of the associated media content, or (iv) playing a portion of the associated media content that precedes a portion of the associated media content that is currently queued for playback;

determining that the particular group of one or more playback devices is no longer associated with any media content; and in response to determining that the particular group of one or more playback devices is no longer associated with any media content:

removing the one or more transport controls from the modified particular control representation, thereby causing the graphical interface to display the particular control representation without the one or more transport controls, and returning the visible border of the particular control representation to an unmodified state.

10. The method of claim 9, wherein receiving the indication that the particular group is associated with media content further comprises: (i) receiving an indication that the media content is being played by one or more playback devices in the particular group, (ii) receiving an indication that the media content is paused by one or more playback devices in the particular group, or (iii) receiving an indication that a playback queue associated with the particular group is populated with the media content.

11. The method of claim 9, wherein causing the graphical interface of the control device to display the control interface that comprises multiple control representations in respective regions of the control interface comprises causing the graphical interface of the control device to display the particular control representation in a first region occupying a first area within the displayed control interface, and wherein modifying the particular control representation to facilitate inclusion of the one or more transport controls comprises expanding the visible border and the first region to occupy a second area within the displayed control interface that is larger than the first area.

12. The method of claim 9, further comprising:
in response to receiving the indication that the particular group of one or more playback devices is associated with media content, modifying the particular control representation to include a volume slider control that controls volume of the particular group.

13. The method of claim 9, further comprising:
in response to receiving the indication that the particular group of one or more playback devices is associated with media content, modifying the particular control representation to include a volume slider control that controls volume of a particular playback device of the particular group.

14. The method of claim 9, further comprising:
in response to receiving the indication that the particular group of one or more playback devices is associated with media content, modifying the particular control representation to include a shuffle control that causes the particular group to play back media items of the associated media content in random order.

15. The method of claim 9, further comprising:
in response to receiving the indication that the particular group of one or more playback devices is associated with media content, modifying the particular control representation to include a repeat control that causes the particular group to repeatedly play back the associated media content.

16. The method of claim 9, wherein the control interface that comprises multiple control representations in respective regions of the control interface is a first control interface, and wherein the method further comprises:
before causing the graphical interface of the control device to display the first control interface, receiving, within a second control interface, an input representing a command to display the first control interface, wherein the graphical interface of the control device is caused to display the first control interface in response to receiving the input representing the command to display the first control interface.

17. A control device comprising:
a graphical interface;
a network interface;
one or more processors; and
tangible, non-transitory, computer-readable media having instructions encoded therein, wherein the instructions, when executed by the one or more processors, cause the control device to perform a method comprising:

causing the graphical interface to display a control interface that comprises multiple control representations in respective regions of the control interface, wherein each control representation includes a visible border that delineates the control representation from other control representations, and one or more graphical features arranged within the visible border, wherein each control representation of the multiple control representations corresponds to a respective group of one or more playback devices that are distinct from the control device, and wherein a particular control representation of the multiple control representations corresponds to a particular group of one or more playback devices that are distinct from the control device,
receiving an indication that the particular group of one or more playback devices is associated with media content comprising receiving an indication that the media content is cached for playback by the particular group of one or more playback devices,
in response to receiving the indication that the particular group of one or more playback devices is associated with media content, modifying the visible border of the particular control representation to a modified state that facilitates inclusion of one or more transport controls within the visible border of the particular control representation and repositioning control representations associated with different groups of one or more playback devices to different regions of the graphical interface so they are displayed without overlapping the particular control representation;
depicting within the visible border the one or more transport controls, wherein each of the one or more transport controls corresponds to a respective playback action of the following playback actions: (i) initiating playback of the associated media content, (ii) pausing playback of the associated media content, (iii) skipping playback of a portion of the associated media content and playing a portion of the associated media content that follows the skipped portion of the associated media content, or (iv) playing a portion of the associated media content that precedes a portion of the associated media content that is currently queued for playback;
determining that the particular group of one or more playback devices is no longer associated with any media content; and
in response to determining that the particular group of one or more playback devices is no longer associated with any media content:
removing the one or more transport controls from the modified particular control representation, thereby causing the graphical interface to display the particular control representation without the one or more transport controls, and
returning the visible border of the particular control representation to an unmodified state.

18. The control device of claim 17, wherein receiving the indication that the particular group is associated with media content further comprises: (i) receiving an indication that the media content is being played by one or more playback devices in the particular group, (ii) receiving an indication that the media content is paused by one or more playback devices in the particular group, or (iii) receiving an indication that a playback queue associated with the particular group is populated with the media content.

19. The control device of claim 17, wherein causing the graphical interface of the control device to display the control interface that comprises multiple control representations in respective regions of the control interface comprises causing the graphical interface of the control device to display the particular control representation in a first region occupying a first area within the displayed control interface, and wherein modifying the particular control representation to facilitate inclusion of the one or more transport controls comprises expanding the visible border and the first region to occupy a second area within the displayed control interface that is larger than the first area.

20. The control device of claim 17, wherein the method further comprises:
 in response to receiving the indication that the particular group of one or more playback devices is associated with media content, modifying the particular control representation to include a volume slider control that controls: (i) volume of the particular group or (ii) volume of a particular playback device of the particular group.

21. The control device of claim 17, wherein the method further comprises:
 in response to receiving the indication that the particular group of one or more playback devices is associated with media content, modifying the particular control representation to include a shuffle control that causes the particular group to play back media items of the associated media content in random order.

22. The control device of claim 17, wherein the method further comprises:
 in response to receiving the indication that the particular group of one or more playback devices is associated with media content, modifying the particular control representation to include a repeat control that causes the particular group to repeatedly play back the associated media content.

* * * * *